INVENTOR
LUTHER E. PATTERSON
BY
ATTORNEYS

Dec. 4, 1951 L. E. PATTERSON 2,577,206
WOODWORKING MACHINE WITH A SWINGABLY
ADJUSTABLE TOOL SPINDLE
Filed April 14, 1948 3 Sheets-Sheet 2

INVENTOR
LUTHER E. PATTERSON
BY
Toulmin & Toulmin
ATTORNEYS

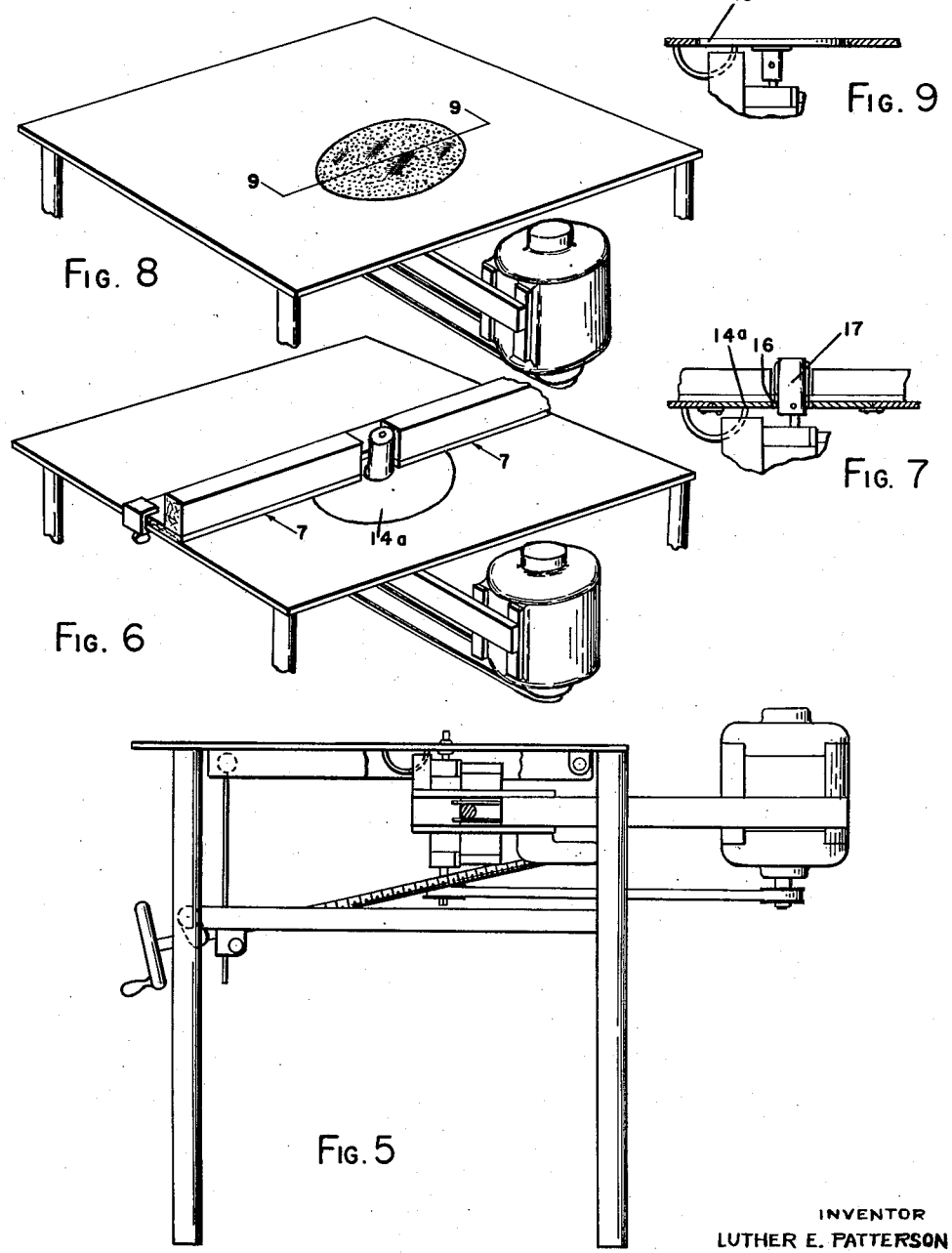

Patented Dec. 4, 1951

2,577,206

UNITED STATES PATENT OFFICE 2,577,206

WOODWORKING MACHINE WITH A SWING-ABLY ADJUSTABLE TOOL SPINDLE

Luther E. Patterson, Covington, Ohio, assignor of one-half to Cleo D. Gist, Dayton, Ohio Application April 14, 1948, Serial No. 21,079

8 Claims. (Cl. 144—1)

This invention relates particularly to a woodworking machine that may be used for several purposes such as a circular saw, a shaper, a sander, or a joiner by controlling the position of the spindle of the machine.

It is an object of this invention to provide an improved mechanism by which a spindle of a woodworking machine can be placed either parallel to a working table or normal thereto for serving several purposes and to provide all movements of raising and lowering the spindle relative to the table when it is in a position either parallel to or normal to the table and to provide for various angular positions of the spindle relative to the table.

It is still another object of the invention to provide a machine in accordance with the foregoing object wherein the setting of the spindle in various angular positions relative to the table is controlled independently and the particular position of the spindle relative to the table when in either a position parallel thereto or one normal thereto is controlled independently.

It is still another object of the invention to provide a substantially all purpose woodworking machine in which the angular positions of the spindle relative to the table and the height of the spindle relative to the table are independently controlled.

It is still another object of this invention to provide a woodworking machine in which the spindle of the machine can be shifted from a position parallel to the table of the machine to a position normal to the table of the machine with substantially the full spindle length projecting above the table when the spindle is in a position normal to the table.

Further objects and advantages will become apparent from the drawings in the following description.

In the drawings:

Figure 5 is a front elevational view of the machine similar to that of Figure 4 but showing the spindle of the machine positioned normal to the table of the machine.

Figure 6 is a perspective elevational view of a part of the machine illustrating it being used as a shaper or a vertical joiner.

Figure 7 is a cross-sectional view of a part of the machine shown in Figure 6 and is taken along line 7—7 of Figure 6.

Figure 8 is a perspective elevational view of a part of the machine illustrating its use as a sander.

Figure 9 is a cross-sectional view of a part of a machine taken along line 9—9 of Figure 8.

In this invention the machine is illustrated as a woodworking machine, but it is, of course, understood that it can be adapted for other purposes.

Figure 3:
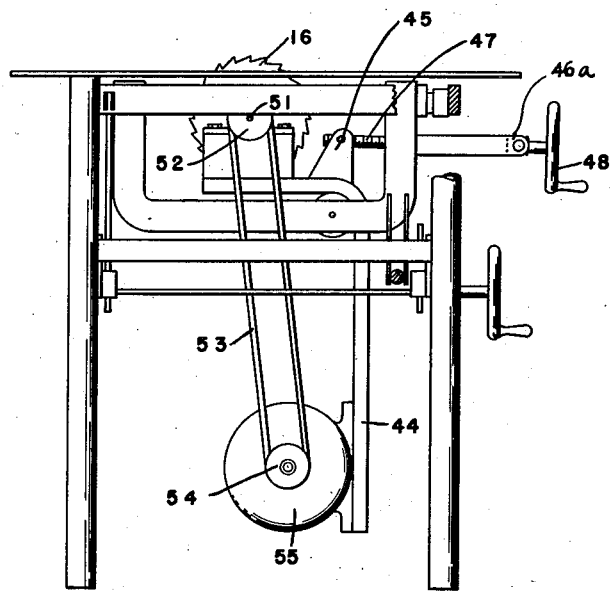
Figure 3 is a side elevational view of the machine taken from the left-hand side of the machine as viewed in Figure 1.

The machine 10 consists of a table 11 supported on the legs 12. A circular opening 13 is provided in the table 11 to receive the tools or the spindle of the machine. The opening 13 may be closed by a disc 14 having a slot 15 therein to receive a circular saw blade 16 as shown in Figure 3, or a disc 14a having a circular opening 16 which may be used in the opening 13 when joiner blades or shaper blades 17 are used, shown in Figures 6 and 7. Also, the circular opening 13 may be closed by a sanding disc 18 when the machine is used as a sander, as shown in Figures 8 and 9.

Suitable brackets 19 are provided to support the discs 14 or 14a, it, of course, being understood that the sander disc 18 is carried on the spindle of the machine.

Beneath the table 11 there is a rectangular frame 20 that is pivotally connected at one end thereof to the table 11 by the brackets 21 and pivot pins 22. This frame 20 is movable up and down about the pivots 22 by a rack 23 pivotally connected to the frame 20 by means of the pivot connection 24. The rack 23 is operated by a screw 25 on the end of which there is provided the hand-wheel 26.

The frame 20 supports a U-shaped cradle 30 that is formed of the two U-shaped members 31 and 32. At each end of the cradle 30 there is provided a pivot connection which supports the cradle 30 between opposite sides of the frame 20. This pivot connection consists of an arcuately shaped track 33 and an arcuately shaped guide segment 34.

The cradle 30 has a bracket 35 carrying a pivot block 36 which receives a screw 37 on the end of which is secured the hand-wheel 38. Operation of the hand-wheel 38 causes the cradle 30 to move substantially directionally the same as the movement of the frame 20 that can be caused by the rack 23 upon operation of the hand-wheel 26.

The cradle 30 carries an inverted L-shaped support 40 that is pivotally connected between the members 31 and 32 of the cradle 30 by means of the pivot block 41 and pivot pin 42. The upper leg 43 of the support 40 is positioned between the cradle 30 and the table 11 and carries a spindle 50 having the spindle shaft 51 extending therefrom on which tools such as the saw 16 (Fig. 3) and the shaper blade 17 (Fig. 7) are adapted to be supported.

The opposite end of the spindle shaft 51 carries a pulley 52 (Fig. 3) that is drivingly connected by a belt 53 with the pulley 54 carried by the electric motor 55 that is supported upon the leg 44 of the support 40.

The upper leg 43 of the support 40 carries the brackets 45 that receive the pivot block 46 (Fig. 1) which cooperates with a screw 47 pivoted at 46a to the brackets 49, a handwheel 48 (Fig. 3) is on the end of the screw 47 for rotating the support 40 about the pivot 42. Thus, the support 40 is moved normal to the movement of the cradle 30.

Figure 1:
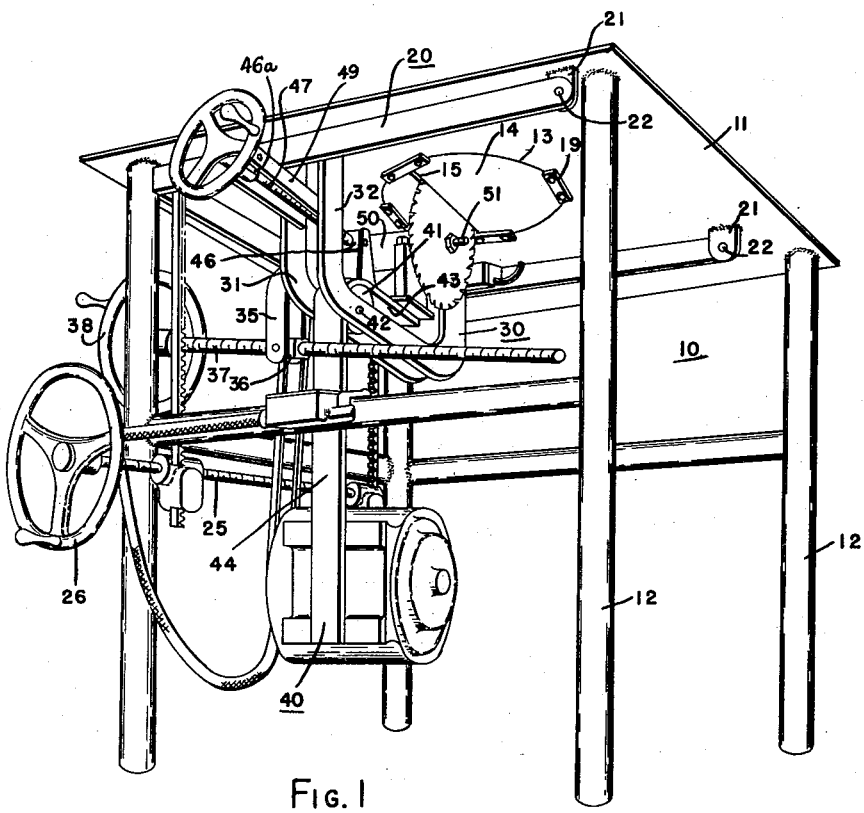
Figure 1 is a perspective elevational view taken from beneath the table of the machine.

With the mechanism of the device positioned as shown in Figure 1, the spindle shaft 51 is parallel to the table 11 so that a saw blade 16 can be placed on the spindle shaft for use of the machine as a power saw. The spindle shaft 51 can be raised and lowered relative to the table 11 by means of the operation of the screw 47 rotating the support 40 about the pivot 42, thus, raising and lowering a saw blade carried on the spindle 51.

Angular positioning of the spindle shaft 51 relative to the table 11 for making angular cuts with a saw blade carried on the shaft 51 is accomplished by rotation of the screw 37. Thus, the normal positions are obtained for operating the machine as a power saw.

Figure 2:
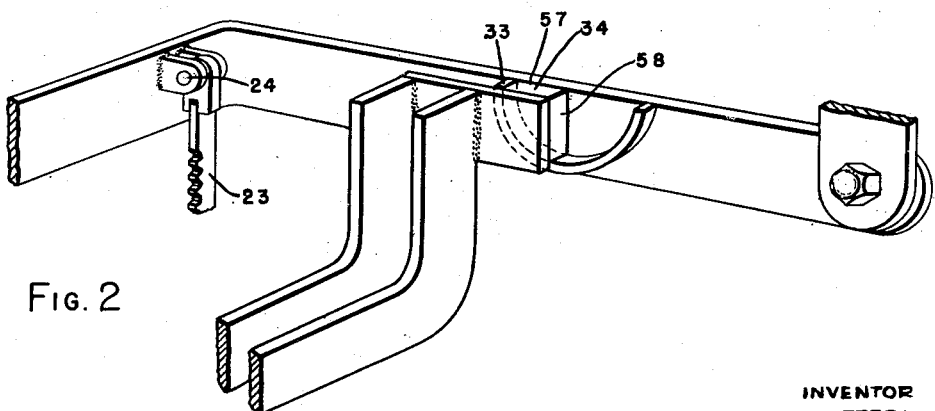
Figure 2 is a perspective elevational view of a part of the machine illustrating the manner of pivoting a cradle on a frame.
Figure 4:
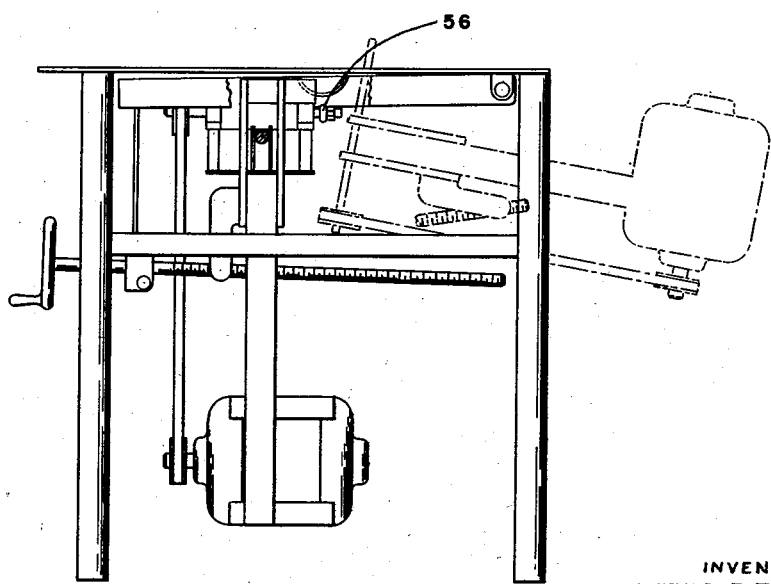
Figure 4 is a front elevational view of the machine as shown in Figure 1.

When it is desired to operate the machine as a sander or as a shaper, the screw 37 is rotated until the cradle and the support 40 are in the position shown in Figure 5. It will be noted that when the spindle is placed in position as shown in Figure 5 that the full length of the spindle projects above the table 11. This is accomplished by placing the pivots for the cradle 30 substantially in line with the tool engaging means 56 on the spindle shaft 51, as shown in Figure 4. Also, if desired, the guide segment 34 of the pivot for the cradle 30 can be provided with the right angular faces 57 and 58 (Fig. 2) which may provide stops against the table 11 to accurately align the spindle either parallel thereto or normal thereto. The frame 20 will, of course, be positioned against the bottom face of the table 11, as illustrated in Figure 5.

To adjust the vertical extension of the spindle 51 when it is in the position normal to the table, as illustrated in Figures 5 to 9, the frame 20 may be lowered by means of the racks 23. Realignment of the spindle 51 normal to the table 11 can then be accomplished through the screw 37.

While the apparatus disclosed and described constitutes a preferred form of the invention, yet, it will be understood that it is capable of alteration without distinguishing from the spirit of the invention and that all modifications that fall within the scope of the appended claims are intended to be included herein.

Having thus fully described my invention, what I claim as new and desire to secure by Letters Patent is:

1. A woodworking machine including, a table, a frame, means pivotally mounting said frame at one end thereof beneath said table on an axis parallel to said table for movement up and down relative to said table, a cradle pivotally carried on said frame on pivot means pivoting said cradle on an axis parallel to the pivot mounting of said frame, a spindle carried on said cradle normal to the pivot axis thereof, and means connected to said cradle for pivoting the same on said frame to position said spindle parallel to said table or normal thereto.

2. A woodworking machine including, a table, a rectangular frame, means pivotally mounting said frame at one end thereof on an axis parallel to said table for movement relative to said table, means connected to said frame at the opposite end thereof for moving the same in an up and down movement relative to said table, a cradle pivotally carried between opposite sides of said frame on a pivot axis parallel to the pivot axis of said frame, a spindle carried on said cradle with the axis thereof normal to the pivot axis of said cradle, and means connected to said cradle for pivoting the same on said frame in a movement directionally the same as the movement of said frame relative to said table to position said spindle selectively either parallel to said table or normal thereto.

3. A woodworking machine including, a table, a multiple sided frame, means pivotally mounting said frame at one end thereof on an axis parallel to said table for movement relative to said table, means connected to said frame for moving the same in an up and down movement relative to said table, a cradle extending between opposite sides of said frame, means pivotally connecting said cradle to said frame on an axis parallel to the pivot axis of said frame relative to said table for movement of said cradle directionally the same as the movement of said frame relative to said table, said pivot means consisting of an arcuately shaped track segment and an arcuately shaped guide segment supported in said track and connected between said cradle and said frame at an extended distance at one side of said cradle substantially in the plane of a disc tool when carried on the spindle of the machine, a spindle carried on said cradle with the axis thereof normal to the pivot axis of said cradle, and means connected to said cradle for pivoting the same on said frame to position said spindle selectively parallel to said table or normal thereto.

4. A woodworking machine including, a table, a frame, means pivotally mounting said frame at one end thereof on an axis parallel to said table for movement relative to said table, means connected to said frame for moving the same in an up and down movement relative to said table, a U-shaped cradle suspended from said frame between opposite sides thereof and pivotally connected thereto on an axis parallel to the pivot axis for said frame, a spindle carried on said cradle and positioned between said cradle and said table with the axis thereof normal to the pivotal axis of said cradle, and means connected to said cradle for pivoting the same on said frame to position said spindle selectively either parallel to said table or normal thereto.

5. A woodworking machine including, a table, a frame, means pivotally mounting said frame at one end thereof on an axis parallel to said table for movement up and down relative to said table, a cradle pivotally carried on said frame on an axis parallel to the pivot axis of said frame, a support pivotally carried on said cradle for movement normal to the movement of said cradle, a spindle carried on said support with its axis normal to the pivot axis of said cradle, a separately acting means for moving said frame, said cradle and said support for selecting the position of said spindle relative to said table parallel and angular thereto.

6. A woodworking machine including, a table, a multiple sided frame, means pivotally mounting said frame at one end thereof on an axis parallel to said table for movement relative to said table, a cradle pivotally carried on said frame between opposite sides thereof on an axis parallel to the pivot axis of said frame for movement directionally the same as the movement of said frame, a support pivotally carried on said cradle on an axis normal to the pivot axis of said frame for movement thereof normal to the movement of said cradle, a spindle carried on said support and positioned between said cradle and said table with the axis thereof parallel with the pivot axis of said support, and independently acting means connected to said support, said cradle and said frame for positioning of said spindle relative to said table.

7. A woodworking machine including, a table, a frame, means pivotally mounting said frame at one end thereof on an axis parallel to said table for movement up and down relative to said table, a cradle, means pivotally supporting said cradle on said frame between opposite sides thereof on an axis parallel to the pivot axis of said frame, for movement directionally the same as the movement of said frame, a support having a part thereof positioned between said cradle and said table and another part thereof positioned beneath said cradle, means pivotally connecting said support on said cradle on an axis normal to the pivot axis for said cradle for movement normal to that of the cradle, a spindle carried on that part of said support that is between said cradle and said table with its axis parallel to the pivot axis for said support, a prime mover carried on that part of said support that is positioned beneath said cradle and including means drivingly connecting said prime mover with said spindle, means for moving said support to adjust the parallel position of said spindle relative to said table, means for moving said cradle on said frame to position said spindle selectively parallel or normal to said table or angularly thereto between the said positions, and means for moving said frame upwardly and downwardly to adjust the position of said spindle relative to said table when it is in a position normal to the table.

8. A woodworking machine including, a multiple sided frame, means pivotally mounting said frame at one end thereof on an axis parallel to said table for movement up and down relative to said table, a U-shaped cradle comprising parallel members and pivotally carried on said frame between opposite sides thereof on an axis parallel to the pivot axis of said frame for movement directionally the same as the movement of said frame, a support pivotally connected to between said members of said cradle on an axis normal to the pivot axis of said frame for movement normal thereto and having one leg thereof positioned above the bottom portion of said cradle and another leg thereof positioned below said cradle, a spindle carried on said one leg of said support with its axis parallel to the pivot axis of said support, a prime mover carried on said other leg of said support and including means drivingly connecting said prime mover with said spindle, means for moving said support to adjust the parallel position of said spindle relative to said table, means for moving said cradle on said frame to position said spindle selectively parallel or normal to said table or angularly thereto between the said positions, and means for moving said frame upwardly and downwardly to adjust the position of said spindle relative to said table when it is in a position normal to the table.

LUTHER E. PATTERSON.

REFERENCES CITED

The following references are of record in the file of this patent:

UNITED STATES PATENTS

| Number | Name | Date |
|---|---|---|
| 583,678 | Fifield | June 1, 1897 |
| 1,821,113 | Neighbour | Sept. 1, 1931 |
| 2,022,288 | Knapp | Nov. 26, 1935 |
| 2,131,492 | Ocenasek | Sept. 27, 1938 |
| 2,292,872 | Eastman | Aug. 11, 1942 |
| 2,299,262 | Uremovich | Oct. 20, 1942 |
| 2,323,247 | Sellmeyer | June 29, 1943 |
| 2,455,097 | Scianna | Nov. 30, 1948 |

FOREIGN PATENTS

| Number | Country | Date |
|---|---|---|
| 10,535 | Australia | Nov. 23, 1927 |